United States Patent [19]
Booth

[11] 4,349,064
[45] Sep. 14, 1982

[54] INERTIAL TIRE PRESSURE REGULATORS

[76] Inventor: George R. Booth, 6815 Landor La., Springfield, Va. 22152

[21] Appl. No.: 145,562

[22] Filed: May 1, 1980

Related U.S. Application Data

[63] Continuation of Ser. No. 961,448, Nov. 17, 1978, abandoned.

[51] Int. Cl.³ .............................................. B60C 23/10
[52] U.S. Cl. .................................. 152/418; 417/211; 417/233
[58] Field of Search ............... 152/419, 418, 415, 427, 152/420–426; 417/211, 233, 231, 328

[56] References Cited

U.S. PATENT DOCUMENTS

| | | | |
|---|---|---|---|
| 442,948 | 12/1890 | Bowley | 152/426 |
| 2,030,592 | 2/1936 | Hosking | 152/418 |
| 2,206,621 | 7/1940 | Smith | 152/426 |
| 3,150,705 | 9/1964 | Geraghty | 152/426 |

*Primary Examiner*—John E. Kittle
*Assistant Examiner*—Thomas Bokan
*Attorney, Agent, or Firm*—Otto M. Wildensteiner; Harold P. Deeley, Jr.

[57] ABSTRACT

A tire pump that is mounted on the rim, inside the tire. The pump is operated by centrifugal force when the tire rolls along the highway; it is designed to keep the air pressure within the tire at a constant, pre-set, level.

7 Claims, 1 Drawing Figure

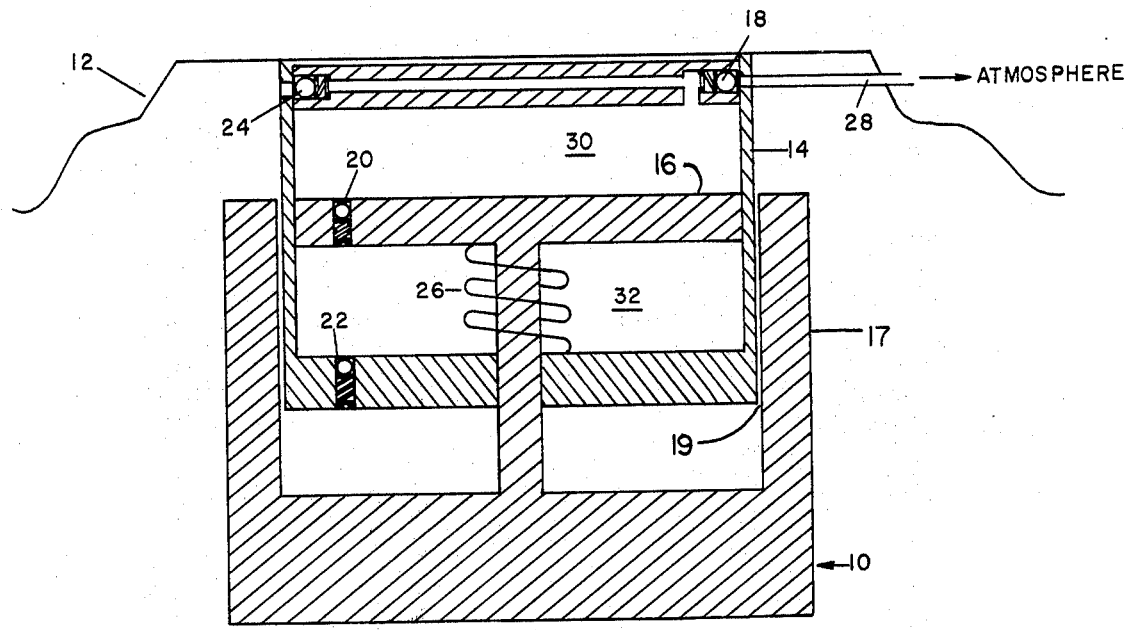

INERTIAL TIRE PRESSURE REGULATORS

STATEMENT OF GOVERNMENT INTEREST

The invention described herein was made by an employee of the U.S. Government and may be manufactured and used by or for the Government for Governmental purposes without the payment of any royalties thereon or therefor.

RELATED APPLICATION

The present application is a continuation in part of application Ser. No. 961,448 filed Nov. 17, 1978, now abandoned.

BACKGROUND

Low tire pressure is a problem that causes reduced gas mileage (due to the greater rolling resistance of a soft tire) and increased tire wear (due to the greater heat buildup of a soft tire), and can contribute to accidents because of the uneven handling of a car with one soft tire. Most people are vaguely aware of the fact that low tire pressure is bad, but they are not sure of the exact reasons and hence are not too concerned with checking their tires.

Before the general introduction of radial tires, a soft bias-ply tire could be detected merely by looking at it. Radial tires, because of their very flexible sidewalls, always look soft (compared to bias-ply tires); thus a radial tire whose pressure is low is very difficult to detect except by checking its pressure with a guage. As a result, most people do not check the pressure in their tires until the tires are obviously quite soft; by this time, however, the tire has had its life reduced by several hundred miles. In addition, a soft tire has degraded cornering and traction properties; it has been estimated that accidents due to low tire pressure cost 670 lives and $350 million annually while the fuel economy penalty has been estimated at $700 million annually.

A loss of pressure that results in a soft, rather than a flat, tire is not caused by a puncture; it is the result of a slow leak, possibly past the bead of the tire where it contacts the rim. A small pump that supplies a small quantity of air at the proper pressure to the tire would keep the tire at the proper pressure except if it got punctured. There have been many such pumps proposed in the past, but all of them were too complex to be workable; furthermore, most of them had external connections to the vehicle's chassis. This latter feature has two inherent drawbacks: (1) it makes it difficult, if not impossible, to use such a pump on the front wheels; (2) the external connections are subject to being accidentally or deliberately torn off. A pump that is wholly inside the tire, however, does not have these drawbacks.

OBJECTS OF THE PRESENT INVENTION

Accordingly, it is an object of the present invention to provide a tire pump that is wholly within a tire.

It is a further object to provide such a pump having a single moving part except for check valves.

It is a further object to provide such a pump wherein the single moving part moves radially with respect to the rim on which the tire is mounted.

It is a further object to provide such a pump wherein air is recirculated through the pump rather than vented to prevent the buildup of excessive pressure within the tire.

SUMMARY

Briefly, the present invention is a tire pump mounted within a tire; the piston moves radially with respect to the rim it is mounted on and is actuated by centrifugal force as the tire rolls along the ground. When the pressure within the tire reaches a pre-set level the air in the tire is recirculated through the pump to prevent the buildup of excessive pressure.

BRIEF DESCRIPTION OF THE DRAWING

The only FIGURE in the case is a cross section of the pump of the present invention mounted within a tire.

DESCRIPTION OF THE PREFERRED EMBODIMENT

The FIGURE shows pump 10 welded or otherwise fixed to rim 12 with the centerline of the pump on the centerline of the rim for balance purposes. While only one pump is shown, it is obvious that two or more, equally spaced around the circumference of the rim, should be used in order to balance their weight around the circumference.

Pump 10 comprises cylinder 14 and piston 16, the only moving part, sliding within it; there are also check valves 18, 20, 22 and 24 which control the flow of air, and spring 26 which returns piston 16 to its innermost position when the wheel stops rolling. Piston 16 is shown as having a skirt 17 which surrounds the outside cylinder; this configuration is not critical, since its only function is to increase the weight of the piston as will be explained below. Annulus 19, between skirt 17 and cylinder 14, is the passage through which pressurized air enters the tire, as will be explained below.

Port 28 is open to the atmosphere and provides the inlet for air to the pump.

Operation of the pump is as follows. When the wheel is at rest spring 26 forces piston 16 to the bottom of cylinder 14. As the wheel rolls, the centrifugal force it develops causes piston 16 to move radially outward; as it does so the lowered pressure in chamber 30 causes check valve 18 to open and allow unpressurized air to enter low pressure chamber 30. At the same time the air in high pressure chamber 32 is pressurized, and when it reaches a pre-set pressure (determined by the strength of the spring in check valve 22) it opens check valve 22 and flows into the tire through annulus 19. When piston 16 reaches the end of its travel it stays there until the vehicle slows down. As the vehicle slows down the centrifugal force acting on piston 16 decreases until spring 26 begins to force piston 16 down into cylinder 14 again. When this happens check valves 18 and 22 close and check valve 20 opens, and the air in chamber 30 is transferred to chamber 32. The pump is now ready for another cycle.

Ultimately the pressure within the tire will build up to a level (determined by the strength of the spring in check valve 24) that will open check valve 24 instead of check valve 18 as piston 16 moves outward; this will recycle air that is already in the tire through pump 10, thereby keeping the pressure from exceeding a pre-set value due to the action of pump 10. However, since excess pressure is not vented the tire can be deliberately inflated to a pressure greater than that allowed by check valve 24 when desired. This is advantageous over prior art pumps, which autmotically vent air when the pressure exceeds the design pressure level, since the temperature of a tire can experience a wide fluctuation during summer and hence the air pressure within the tire also experiences the same fluctuation. That is, during the day if the tire is rolling over a hot road at high speed it will become hot and the air pressure within it will rise; at night when the tire cools down the pressure will drop. If the high pressure during the day were vented then the pressure would be too low the next morning; driving on the tire in this condition would reduce its life.

Additionally, there are situations wherein it is desirable that the pressure be raised above normal (e.g., for sustained high speed driving, or when carrying a heavier than normal load in the vehicle); with the present invention the tire can be inflated to a desired higher pressure for as long as needed then the pressure reduced to normal by letting air out at the valve stem as at present.

Thus the present invention prevents the tire from becoming underinflated due to temperature fluctuations; yet it allows the tire to be deliberately inflated to a higher pressure whenever this is desired.

As stated earlier, piston 16 must be heavy enough so that at a reasonable speed of the vehicle the centrifugal force of piston 16 will be sufficient to overcome the force of spring 26, the air pressure within the tire (so that check valve 22 will open), and the friction of piston 16 on the walls of cylinder 14. This is the reason for incorporating skirt 17; it adds weight to the piston to produce the centrifugal force necessary to operate the pump at a reasonable speed. Likewise, the force of spring 26 must be sufficient to overcome the weight of piston 16 and the friction of piston 16 on the walls of cylinder 14.

The springs in check valves 18, 20, and 22 should be relatively weak because these valves are not intended to regulate any of the pressures in any of the chambers; they are intended to be one-way valves only.

Pump 10 is not designed to inflate a tire from scratch, nor is it designed to keep a tire inflated after it has been punctured by a nail; pump 10 is designed only to keep a tire from getting dangerously soft due to a slow leak. Therefore it can be very small and will easily fit within the rim. If it is designed to deliver a stroke at a vehicle speed of 30 miles per hour, it will keep a tire properly inflated even if the vehicle is driven infrequently and then only in city traffic.

I claim:

1. A pump for use within a pneumatic tire mounted on a rim to keep said tire from getting dangerously soft due to a slow leak, comprising: a cylinder attached to said rim; a piston within said cylinder, the axes of said cylinder and said piston being disposed radially outward from said rim; a first passage to allow unpressurized outside air to enter said pump; and a second passage to allow pressurized air to enter said pneumatic tire from said pump, said pump being operated by centrifugal force which causes said piston to move radially outward and spring means which forces said piston to move radially inward.

2. A pump as in claim 1 further including means to prevent the buildup of excessive pressure within said pneumatic tire.

3. A pump as in claim 2 wherein said piston divides said cylinder into a low pressure chamber and a high pressure chamber.

4. A pump as in claim 3 wherein said low pressure chamber and said high pressure chamber of said cylinder are connected by a one way valve in said piston, said one way valve allowing flow from said low pressure chamber to said high pressure chamber.

5. A pump as in claim 4 wherein said high pressure chamber of said cylinder is connected to the interior of said pneumatic tire by a one way valve in said cylinder, said one way valve allowing flow from said high pressure chamber into said pneumatic tire.

6. A pump as in claim 5 wherein said means to prevent the buildup of excessive pressure in said pneumatic tire comprises means to recirculate air within said pneumatic tire through said pump.

7. A pump as in claim 6 wherein said means to recirculate air comprises a third passage which allows pressurized air to enter said pump from said pneumatic tire and a one way valve in said third passage, said one way valve allowing pressurized air rather than unpressurized air to enter said pump.

* * * * *